US011283382B1

(12) United States Patent
Miskovic

(10) Patent No.: US 11,283,382 B1
(45) Date of Patent: Mar. 22, 2022

(54) SENSORLESS CURRENT DETERMINATION IN VARIABLE SPEED CONSTANT FREQUENCY (VSCF) GENERATOR CONTROL SYSTEM

(71) Applicant: Hamilton Sundstrand Corporation, Charlotte, NC (US)

(72) Inventor: Vlatko Miskovic, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/136,499

(22) Filed: Dec. 29, 2020

(51) Int. Cl.
*H02P 9/42* (2006.01)
*H02P 9/00* (2006.01)
*H02P 101/30* (2015.01)

(52) U.S. Cl.
CPC .............. *H02P 9/42* (2013.01); *H02P 9/007* (2013.01); *H02P 2101/30* (2015.01)

(58) Field of Classification Search
CPC ......... H02P 9/42; H02P 9/007; H02P 2101/30
See application file for complete search history.

(56) References Cited

U.S. PATENT DOCUMENTS

| | | | |
|---|---|---|---|
| 4,242,628 A | 12/1980 | Mohan et al. | |
| 8,836,293 B1 | 9/2014 | Rozman et al. | |
| 9,325,242 B2 | 4/2016 | Babazadeh et al. | |
| 9,397,593 B2 | 7/2016 | Kato | |
| 9,960,675 B2 | 5/2018 | Almukhtar et al. | |
| 10,404,201 B2 | 9/2019 | Kano et al. | |
| 10,715,029 B1 | 7/2020 | Bax et al. | |
| 2020/0259422 A1 | 8/2020 | Bax et al. | |

FOREIGN PATENT DOCUMENTS

JP          2016039744 A     3/2016

OTHER PUBLICATIONS

US 6,549,435 B2, 04/2003, Huggett (withdrawn)

*Primary Examiner* — Sean Gugger
(74) *Attorney, Agent, or Firm* — Cantor Colburn LLP

(57) ABSTRACT

A VSCF generator system includes a generator and electronics configured to control operations of the generator and a housing. The system also includes a power converter connected to the generator that receives AC current from the generator and converts it to DC current, the power converter including: an output filter that includes a filter capacitor; a sensor assembly that measures a voltage across the filter capacitor; and a controller that receives the measured voltage across the filter capacitor and creates an estimate of a current through the filter capacitor based on the filter capacitor. The estimate is based on a frequency domain representation of the filter capacitor as an ideal differentiator being passed through a bandpass filter with a center frequency equal to the operating frequency of the VSCF generator system and the controller controls operation of the generator portion based on the estimate of current through the filter capacitor.

10 Claims, 4 Drawing Sheets of# SENSORLESS CURRENT DETERMINATION IN VARIABLE SPEED CONSTANT FREQUENCY (VSCF) GENERATOR CONTROL SYSTEM

BACKGROUND

The following description relates to a variable speed constant frequency (VSCF) generator system and, more specifically, to a estimating a current in such a without a sensor and, in some instances, utilizing the estimate to control the VSCF or to confirm proper operation of a sensor, or both.

To produce electric power, aircraft typically use generators coupled to engines located on the wings. Different types of generators have been used that have varying levels of complexity and output power characteristics. Aircraft engines are normally used over a wide range of operating conditions in the air, including takeoff, cruise, descent, and landing. This demands that the engines operate over a range of rotating speeds. Previous generators required constant speed inputs for producing power and use mechanisms including constant speed drives and integrated drive generators. Such devices include heavy hydro-mechanical devices that are coupled to an input shaft rotating at varying input speeds (indexed to the engine speed) and deliver power to an output shaft that rotates at a constant speed, despite the varying input. The heavy hydro-mechanical devices may add unwanted loads to the wings of the aircraft.

Engine coupled generators having speeds directly indexed to an engine operate over the same wide range of operating speeds as the engine. These types of generators are frequently called variable frequency generators (VFGs). It is typical for the requirements and design of wound field type electrical power generators to deliver the same output power, current, and voltage over the entire wide speed range of the input speed.

In some cases, the VFG's can be included into system to create a so-called Variable Speed Constant Frequency (VSCF) generator. Such a generator includes a VFG whose output is connected to rectifier that converts the variable AC output to DC and an inverter which converts DC power into constant frequency AC power.

BRIEF DESCRIPTION

According to an aspect of the disclosure, a variable speed constant frequency (VSCF) generator system is provided. The system includes a generator portion comprising a generator and electronics configured to control operations of the generator and a housing to house the generator and the electronics a VSCF power converter connected to the generator that receives AC current from the generator and converts it to DC current. The VSCF includes: an output filter that includes a filter capacitor; a sensor assembly that measures a voltage across the filter capacitor; and a controller that receives the measured voltage across the filter capacitor and creates an estimate of a current through the filter capacitor based on the filter capacitor. The estimate is based on a frequency domain representation of the filter capacitor as an ideal differentiator being passed through a bandpass filter with a center frequency equal to the operating frequency of the VSCF generator system and the controller controls operation of the generator portion based on the estimate of current through the filter capacitor.

In addition to one or more of the features described above, or as an alternative to any of the foregoing embodiments, the estimate can be based on the relationship $I_C/V_C = s \cdot K_{bp} s/(s^2+K_{bp}s+\omega^2)$ where Ic is the estimated capacitor current, Vc is the voltage across the filter capacitor, $K_{bp}$ is the bandwidth of the bandpass filter, s is a laplace operator and ω is the operating frequency of the VSCF generator system.

In addition to one or more of the features described above, or as an alternative to any of the foregoing embodiments, ω is 2π·400 Hz.

In addition to one or more of the features described above, or as an alternative to any of the foregoing embodiments, $K_{bp}$ is 2π·4000 Hz.

In addition to one or more of the features described above, or as an alternative to any of the foregoing embodiments, the controller creates a signal to adjust an exciter current of the variable frequency generator.

In addition to one or more of the features described above, or as an alternative to any of the foregoing embodiments, the power converter includes and inverter as the controller adjusts timing of signals to the inverted based on the estimate.

A method of controlling a variable-speed constant-frequency (VSCF) generator system that includes a generator portion comprising a generator and electronics configured to control operations of the generator and a housing to house the generator and the electronics is also disclosed. The method includes: receiving AC current from the generator at a VSCF power converter; converting the AC current into a constant frequency output; filtering the constant frequency output with an output filter that includes a filter capacitor; a sensor assembly that measures a voltage across the filter capacitor; receives the measured voltage across the filter capacitor at a controller; creating with the controller an estimate of a current through the filter capacitor based on the filter capacitor, wherein the estimate is based on a frequency domain representation of the filter capacitor as an ideal differentiator being passed through a bandpass filter with a center frequency equal to the operating frequency of the VSCF generator system, and controlling operation of the generator portion based on the estimate of current through the filter capacitor.

In addition to one or more of the features/steps described above, or as an alternative to any of the foregoing embodiments, the controller can estimate based on the relationship $I_C/V_C = s \cdot K_{bp} s/(s^2+K_{bp}s+\omega^2)$ where Ic is the estimated capacitor current, Vc is the voltage across the filter capacitor, $K_{bp}$ is the bandwidth of the bandpass filter, s is a laplace operator and ω is the operating frequency of the VSCF generator system.

In addition to one or more of the features/steps described above, or as an alternative to any of the foregoing embodiments, ω is 2π·400 Hz.

In addition to one or more of the features/steps described above, or as an alternative to any of the foregoing embodiments, $K_{bp}$ is 2π·4000 Hz.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Figure 1:
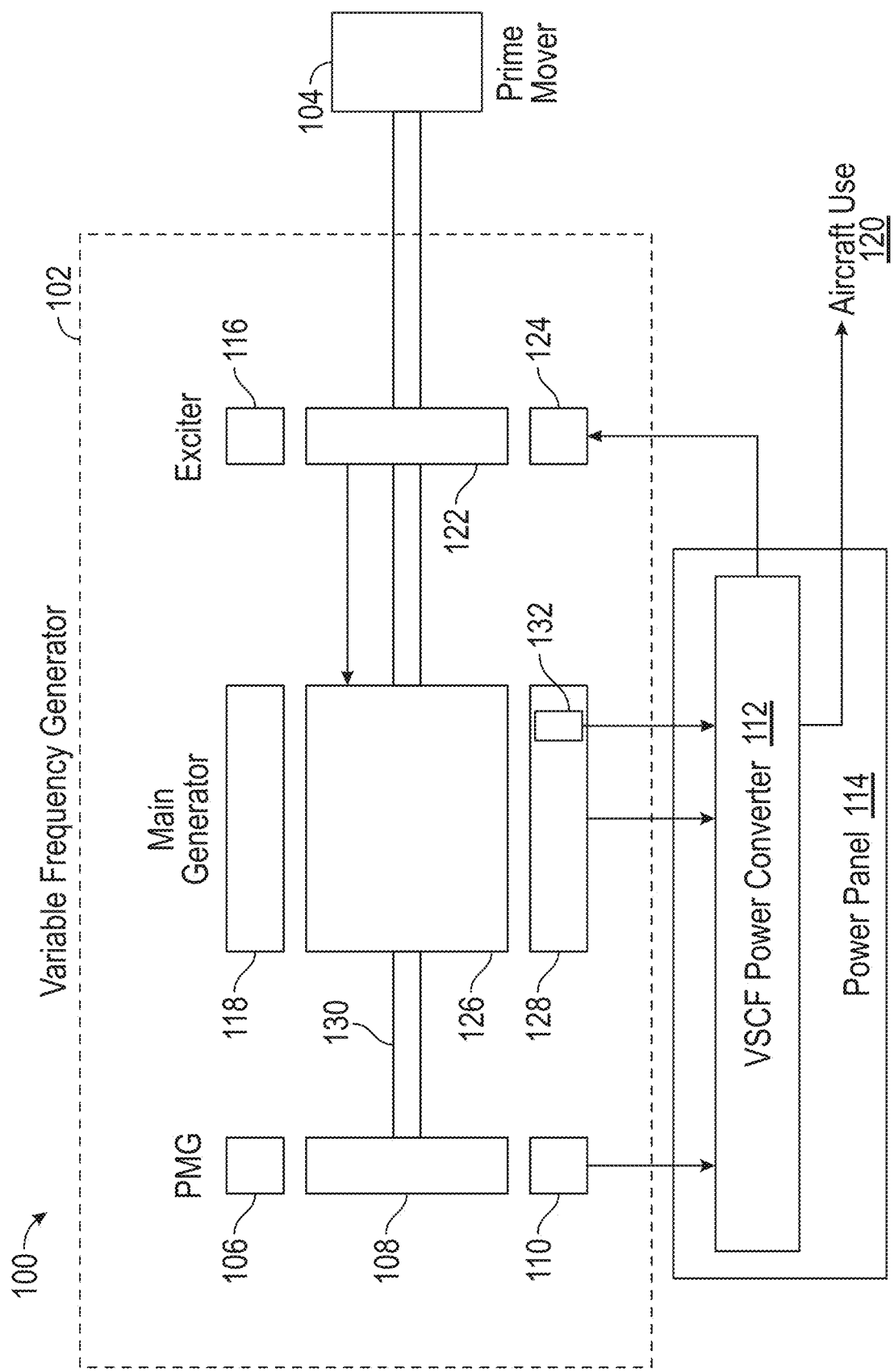
FIG. 1 shows portions of VSCF power generation system according to one embodiment.

As will be described below, a variable speed constant frequency (VSCF) system is provided. For context and a better understating, FIG. 1 illustrates a VSCF power generating system 100 according to a non-limiting embodiment. The VSCF power generating system 100 includes variable frequency generator (VFG) 102 and a VSCF power converter 112. Embodiments herein can be utilized in VSCF power converter 112 to provide a sensor-less determination of a current therein.

The VFG 102 is driven by rotation of a prime mover 104, such as an aircraft engine operating a various speeds. In the example of FIG. 1, the VFG 102 includes a permanent magnet generator (PMG) 106 that comprises a rotating portion 108 and a stationary portion 110. The PMG 106 can include a plurality of permanent magnets and phase windings (not depicted) distributed between the rotating portion 108 and the stationary portion 110 to induce an electric current in response to the prime mover 104 driving the rotating portion 108 to rotate proximate to the stationary portion 110.

A voltage produced by the PMG 106 can be output to the VSCF power converter 112, which may optionally be a unit within a power panel 114 of an aircraft (e.g., within an aircraft fuselage). The voltage from the PMG 106 can be used to power control circuitry within the VSCF power converter 112. In one embodiment, the VSCF power converter 112 controls an exciter 116 of the VFG 102 and regulates an output voltage of a main generator 118 of the VFG 102 at a variable frequency for an aircraft use 120.

The exciter 116 includes a rotating portion 122 and a stationary portion 124. Similarly, the main generator 118 includes a rotating portion 126 and a stationary portion 128. The rotation portion 108 of the PMG 106, the rotating portion 122 of the exciter 116, and the rotating portion 126 of the main generator 118 can all be coupled to a common shaft 130 in one or more segments driven by rotation of the prime mover 104 at varying speeds. Of course, other types of generators could be utilized.

In the example of FIG. 1, the rotating portion 122 of the exciter 116 is electrically coupled to the rotating portion 126 of the main generator 118. The VSCF power converter 112 controls an exciter current provided to the exciter 116, which can adjust the field strength of the main generator 118 to regulate an output voltage of the VFG 102 at stationary portion 128. Various sensors, such as a generator current sensor 132, can also be included for control and fault detection by the VSCF power converter 112.

In one embodiment, the VSCF power converter 112 provides an AC voltage output at or near a constant frequency. In one embodiment, the constant frequency is or is about 400 Hz.

Figure 2:
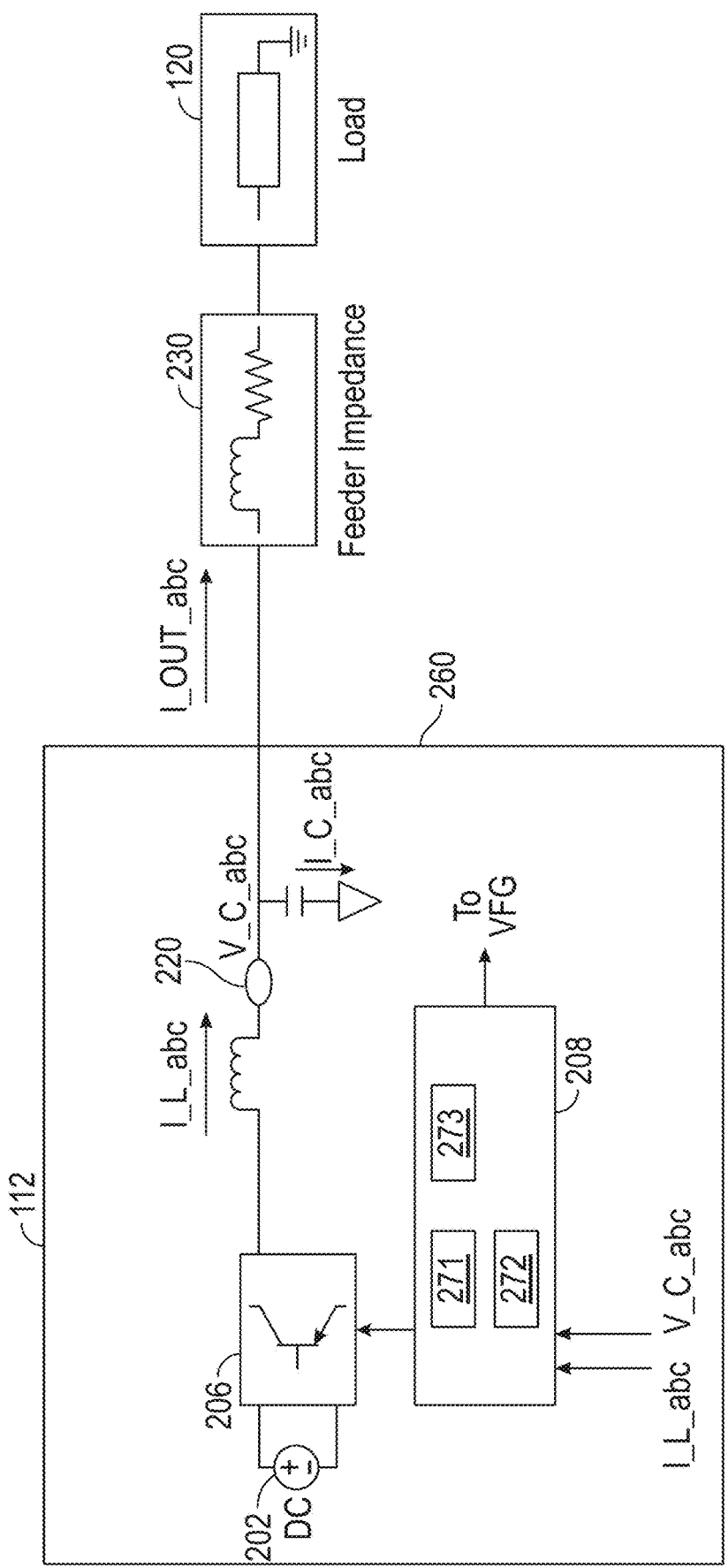
FIG. 2 shows portions of a VSCF power converter according to one embodiment.

In FIG. 2 a more detailed depiction of the VSCF power controller 112 is illustrated. The power controller includes DC power supply 202. The DC power supply can be for example, a rectifier that converts the variable speed/frequency output of the PMG of FIG. 1 into a DC voltage. It should be understood that other types of generators could produce the AC than that shown in FIG. 1. Further, in one example, the DC power supply 202 could be a battery or other charge storing element.

Regardless, the DC power provide by the power supply 202 is rectified to a constant frequency voltage by a rectifier 206. The rectifier can be controlled by a controller 208. The controller can, based on certain inputs, change operation of the system 100 shown in FIG. 1. For instance, the controller 208 could include programing that, based on the inputs, controls current provided to the exciter 116 of the VFG 102 to regulate output voltage of the main generator 118 of the VFG 102.

The rectifier 206 provides a constant frequency output to an output filter comprised of at least a first inductor L and first capacitor C. A sensor assembly 220 is provided to measure current though the first inductor L (shown as I_L_abc in FIG. 2) and a well as the voltage across the first capacitor C (shown and V_C_abc in FIG. 2). The sensor assembly 220 can be formed as a single unit or may be a collection of units. For example, the sensor assembly could include a first current sensor and first voltage sensor. The first current sensor could be located in the position shown in FIG. 2 or the other side of the first inductor L. The first voltage sensor could be arranged as shown to measure voltage form the output 260 to ground but could be more limited to measure a voltage just across the first capacitor C in the event other circuit are provided. In one embodiment, the sensor assembly 220 only measures V_C_abc. As more fully explained below, disclosed herein is an accurate manner to estimate I_C_abc from this measurement of V_C_abc. The first capacitor C may also be referred to as filter capacitor herein. For simplicity, $I_C$ and $V_C$ shall be used to refer to I_C_abc and V_C_abc from time to time below. Similarly, $I_L$ can be used to refer to current through the first inductor.

In accordance with embodiments, the controller 208 may be provided as a stand-alone component or as a component of a flight control computer (FCC). In any case, the controller may include a processing unit 271, a memory unit 272, a networking unit 273 The networking unit 73 provides for communication between the processing unit 71 and various aircraft sensors and databases. For example, the networking unit can allow for communication with the sensor assembly 220 that measures a current output by the rectifier 220 While not illustrated, other sensors could also be provided to measure other currents/voltages in the system.

To help with control of the VSCF, the current through the filter capacitor $I_C$, can further be used to estimate output current ($I_{OUT}=I_L-I_C$), or for other control functions such as active damping of LC resonance.

As discussed above, herein disclosed are systems and methods for creating an estimate of $I_C$ from a measured $V_C$.

As is known, the mathematical relation of capacitor current $I_C$ and voltage $V_C$ is shown below:

$$I_C = C\frac{dVC}{dt}. \tag{1}$$

The can be expressed in the frequency domain as $$C \cdot s \cdot V_C = I_C \tag{2}$$

where 's' is Laplace operator.

Using a mathematical model, and without loss of generality and assuming normalized capacitance C=1, transfer function of IDEAL current estimator is basically ideal differentiator:

$$I_{C\ C}/V_C = s \text{(IDEAL)} \quad (3).$$

However, ideal differentiator has drawback of amplifying high frequency components which is essentially the noise in most cases, so ideal low pass filter is replaced by High Pass Filter, which can be also represented as ideal differentiator followed by Low Pass Filter. This can be represented as:

$$I_{C\ C}/V_C = s \cdot K_{lp}/(s + KlP). \quad (4)$$

where $K_{lp}$ is the gain of the low pass filter and any results related to such an estimate will be referred to as conventional herein.

It has been discovered by the inventor hereof that in such an estimate there is some error in phase and amplitude at any frequency ω (except at zero). The higher the frequency is, the error is bigger and also the lower $K_{lp}$ is, the error is bigger for that same frequency. Setting $K_{lp}$ high also has drawback of amplifying high frequency noise.

The inventor hereof has recognized that such limitations may be reduced or overcome by applying a bandpass filter centered around the fixed frequency output by the VSCF 100.

Figure 3:
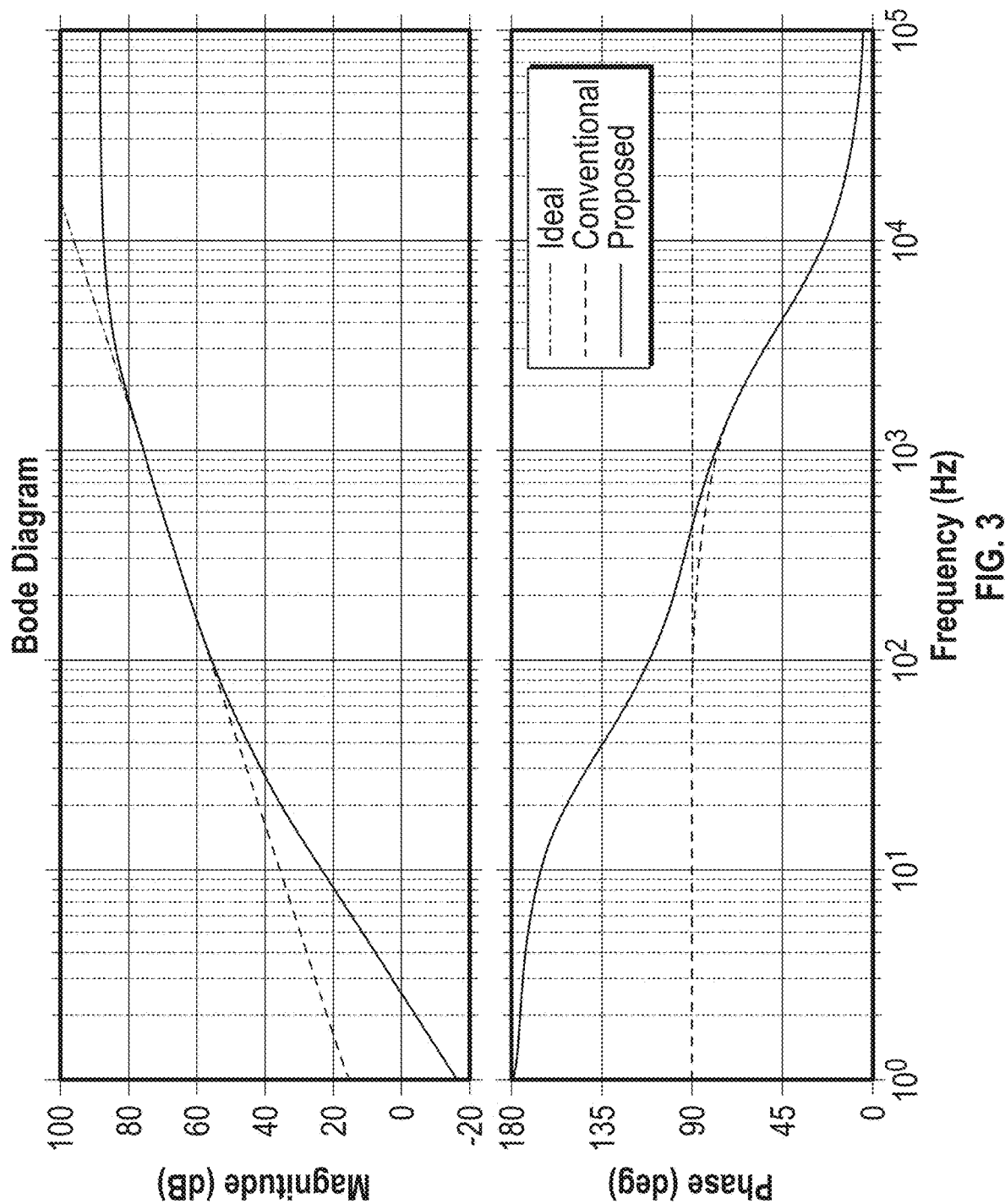
FIG. 3 shows comparisons of different current estimates.

Thus, rather than the above, herein estimates of Ic from $V_C$ can be made based on the following relationship:

$$I_{C\ C}/V_C = s \cdot K_{bp} s/(s^2 + K_{bp} s = \omega^2). \quad (5)$$

where K is the bandwidth of the bandpass filter and ω is the center frequency of the bandpass filter. As shown in FIG. 3, simulation results show that the conventional estimate has error in phase and amplitude, while the disclosed estimate method has zero steady state error as indicated by the proposed trace. For clarity, an ideal response is shown in FIG. 3 as well as labelled as Ideal. In FIG. 3, K for both filters is 4000 (2π) as ω. Of course, other values could be chosen based on the situation.

Figure 4:
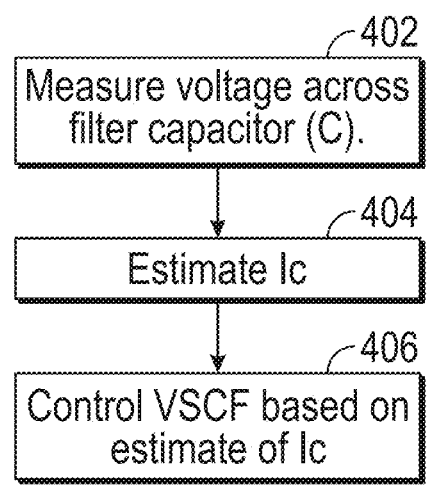
FIG. 4 shows a block diagram of a method according to one embodiment.

With reference to FIGS. 2 and 4 and based on the above, it shall be understood that a method of controlling a VSCF has been disclosed. The method includes measuring voltage across a filter capacitor (C) as indicated by block 402. This can be done, for example, with a sensor in the sensor assembly 220. Based on this measurement, Ic can be estimated as indicated at block 404. The estimate in block 404 can include estimating Vc based on the relationship shown in equation 5 above.

After the estimate of Ic is completed, the method includes controlling the VSCF based on the estimated Ic as shown in block 406. This can include, for example, changing operation of VFG to get a desired Tout.

It shall be appreciated that in the above, a sensorless method has been presented to estimate Ic. This method can be used to determine if a sensor measuring Ic or Iout is operating properly in one embodiment. In such a case, if a sensor error is detected (by comparing the actual to estimated Ic or Iout) the system could operated based on the estimate and/or a service call could be initiated.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A variable speed constant frequency (VSCF) generator system, comprising:
    a generator portion comprising a generator and electronics configured to control operations of the generator and a housing to house the generator and the electronics; and
    a VSCF power converter connected to the generator that receives AC current from the generator and converts the AC current to DC current, the VSCF power converter including:
        an output filter that includes a filter capacitor;
        a sensor assembly that measures a voltage across the filter capacitor; and
        a controller that receives the measured voltage across the filter capacitor and creates an estimate of a current through the filter capacitor based on the filter capacitor,
        wherein the estimate is based on a frequency domain representation of the filter capacitor as an ideal differentiator being passed through a bandpass filter with a center frequency equal to the operating frequency of the VSCF generator system,
        wherein the controller controls operation of the generator portion based on the estimate of current through the filter capacitor.

2. The VSCF generator system according to claim 1, wherein:

$$I_{C\ C}/V_C = s \cdot K_{bp} s/(s^2 + K_{bp} s + \omega^2)$$

where Ic is the estimated capacitor current, Vc is the voltage across the filter capacitor, $K_{bp}$ is the bandwidth of the bandpass filter, s is a laplace operator and ω is the operating frequency of the VSCF generator system.

3. The VSCF generator system according to claim 2, wherein ω is 2π·400 Hz.

4. The VSCF generator system according to claim 3, wherein $K_{bp}$ is 2π·4000 Hz.

5. The VSCF generator system according to claim 2, wherein the controller creates a signal to adjust an exciter current of the variable frequency generator.

6. The VSCF generator system according to claim 2, wherein the power converter includes an inverter as the controller adjusts timing of signals to the inverter based on the estimate.

7. A method of controlling a variable-speed constant-frequency (VSCF) generator system that includes a generator portion comprising a generator and electronics configured to control operations of the generator and a housing to house the generator and the electronics, the method comprising:
    receiving AC current from the generator at a VSCF power converter;
    converting the AC current into a constant frequency output;
    filtering the constant frequency output with an output filter that includes a filter capacitor;
    sensing with a sensor assembly a voltage across the filter capacitor;
    receiving the measured voltage across the filter capacitor at a controller;
    creating with the controller an estimate of a current through the filter capacitor based on the filter capacitor, wherein the estimate is based on a frequency domain representation of the filter capacitor as an ideal differentiator being passed through a bandpass filter with a center frequency equal to the operating frequency of the VSCF generator system; and controlling operation of the generator portion based on the estimate of current through the filter capacitor.

8. The method of claim 7, wherein:

$$\hat{I}_{C\ C}/V_C = s \cdot K_{bp} s/(s^2 + \omega^2)$$

where Ic is the estimated capacitor current, Vc is the voltage across the filter capacitor, $K_{bp}$ is the bandwidth of the bandpass filter, s is a laplace operator and $\omega$ is the operating frequency of the VSCF generator system.

9. The method of claim 8, wherein $\omega$ is $2\pi \cdot 400$ Hz.

10. The VSCF method of claim 9, wherein $K_{bp}$ is $2\pi \cdot 4000$ Hz.

\* \* \* \* \*